Figure 1:
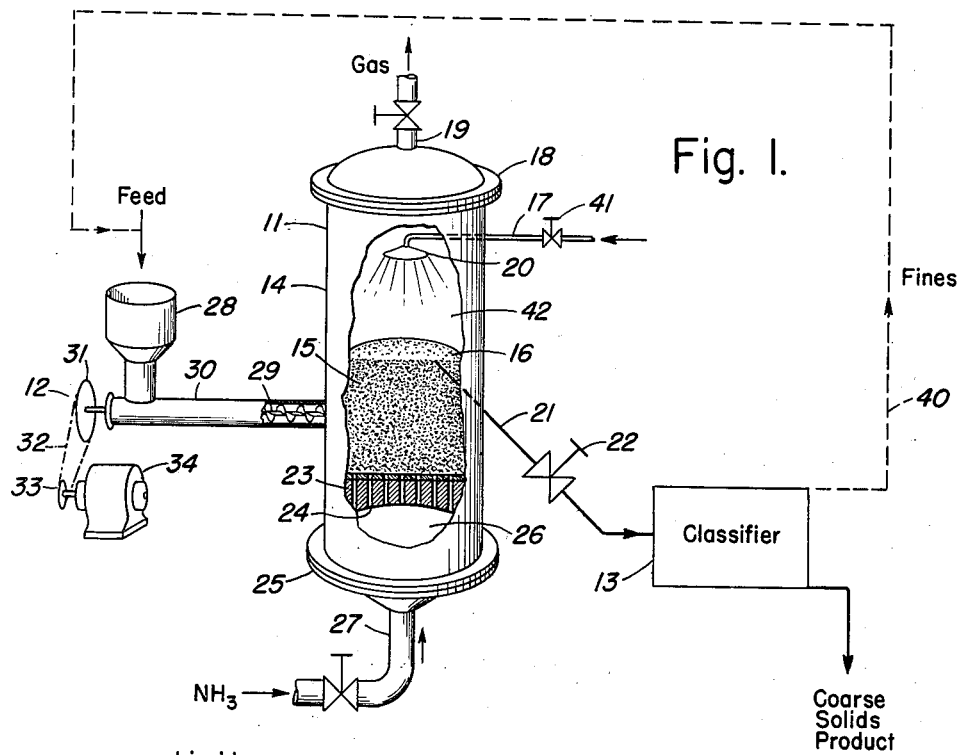
Figures 2, 3, 4:
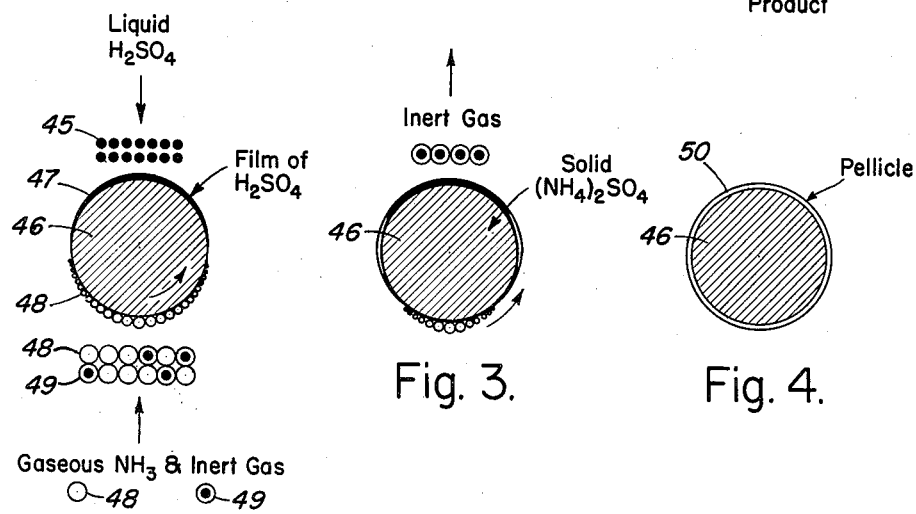
Figure 5:
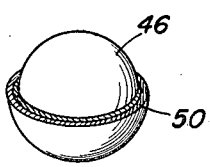

June 10, 1952 — W. A. LUTZ — 2,600,253

FERTILIZER MANUFACTURE

Filed Jan. 21, 1949

INVENTOR:
WILLIAM A. LUTZ,
BY
Arthur Middleton
ATTORNEY

Patented June 10, 1952

2,600,253

UNITED STATES PATENT OFFICE 2,600,253

FERTILIZER MANUFACTURE

William A. Lutz, Westport, Conn., assignor to The Dorr Company, Stamford, Conn., a corporation of Delaware Application January 21, 1949, Serial No. 71,969

2 Claims. (Cl. 71—54)

This invention is useful in the manufacture of solid fertilizers. It is particularly adaptable for the production of fertilizer or other compounds which are solid reaction products of liquid acids and gases, and wherein reaction heat is evolved; the reaction heat serves to vaporize any diluent liquid such as water which is usually associated with the liquid acid, as it would be used commercially. A typical reaction is that between sulfuric acid and ammonia gas which yields solid ammonium sulfate, as $$2NH_3 + H_2SO_4 \rightarrow (NH_4)_2SO_4$$

In the manufacture of fertilizers, it is common to conduct the desired reactions in liquid phase and then evaporate the resulting solution to a point where crystallization can occur. However, control of crystallization is a problem which has received much attention. Depending on the process used, the crystals of the fertilizer compound yielded by the reaction must satisfy several criteria. If direct drying is to be employed, the crystals must be of a size and shape which facilitate good heat transfer rates, yet the crystals must not decrepitate and dust too much on heating. If concentration by blunging processes are employed, then the particle size distribution of the crystals must be carefully controlled as well as the total solids concentration in the liquor so that balling of the solids on the one hand or the formation of thin slurries on the other are avoided. Whatever process of crystal formation is employed, it is important that the product crystals of fertilizer should be relatively large and have sufficient mechanical strength to withstand the shocks of transportation and application to the soil without a high dust loss.

Though, in some instances, fertilizer compounds can be made by wet processes which satisfy all the above criteria, such processes are rather complex, require considerable equipment and labor in their operation and are characterized by high consumption of fuel, which adds unduly to the cost of the marketable product. These difficulties have hampered the widespread use of several compounds as fertilizers. Likewise, "dry" processes wherein dry ammonia gas is contacted with atomized acid in concurrent downward flow have not yielded solid compounds of sufficient size to minimize dust losses in making and in using the fertilizer. In addition, concurrent flow of gas and acid is not suited for the most efficient contact and use of the reactants and the control of operating conditions, such as temperatures in the reaction zone, is difficult.

So, it is an object of this invention to overcome the difficulties of other fertilizer manufacturing processes and yield a fertilizer-compound directly as a reaction product, thus simplifying the manufacturing steps and making the product less expensive. More specifically, it is an object of this invention to yield the reaction product or fertilizer compound in a dust-free, pellicular nodulized form which resists thermal and mechanical shocks. Another object of this invention is to utilize the heat evolved in reacting the acid and gas to vaporize the water or other liquid associated with commercial acids and thus minimize fuel consumption. (As used herein the word fertilizer includes simple or complex solids capable of yielding nutritive values to plants.)

These objects, and others that may appear as this specification proceeds, are attainable by reacting liquid acid and a suitable gas, at appropriate temperatures, in the presence of a fluidized mass or bed of fine solid particles. The nature of a fluidized mass or bed and its importance in this invention will be more fully explained as this specification continues.

The simplest embodiment of this invention (defined with greater precision in the appended claims) is typified by the reaction of liquid sulfuric acid and gaseous ammonia to yield nodules of solid ammonium sulfate. To a vertical enclosed chamber or reactor there is supplied a mass of finely-divided dry ammonium sulfate particles which are preferably finer than 8 mesh (Tyler Standard Screen); these solid particles are supported within the vessel above a gas permeable member, hereafter referred to as a constriction plate. Ammonia gas, under pressure, and possibly diluted with inert components, is supplied to the lower portion of the reactor below the constriction plate; the ammonia flows up through the mass or bed of particles at a low space velocity (of the order of 0.5–5 feet per second) and thereby densely-suspends or fluidizes the solids to a turbulent mobilized mass or bed, which appears like a boiling liquid and which presents a fluid-like surface level. Simultaneously, liquid sulfuric acid is sprayed (or otherwise supplied) to the fluidized solid particles, above the quasi-liquid level. The mobilized particles are coated with a thin film of the acid. The uprising ammonia gas in which the mobilized particles are enveloped reacts with the sulfuric acid film to precipitate more ammonium sulfate in situ on the surface of the nucleus particles of ammonium sulfate. The ammonium sulfate precipitated is probably deposited on the nucleus particles in the form of tiny, if not microscopic-sized, particles which are so small that instead of being knocked off the surface of the original nucleus particle while it follows its whirling, turbulent course, they assume the form of a thin hard skin or pellicle or integument on the nucleus particles. Thus, successive pellicles of fresh ammonium sulfate are deposited in a firmly cohering, tenacious manner on the original nodule nucleus and yield larger sized, firm nodules or pellets of ammonium sulfate. This cohesion and formation of pellicles might be hampered or minimized if there were too much liquid phase water present; this is avoided by regulating the quantity and quality of the sulfuric acid used so that any water diluting the acid is about equivalent to the amount which can be evaporated by the heat generated by the exothermic reaction of the ammonia and acid. The heat absorbed in vaporizing the diluent water also serves to keep the fluidized bed at a uniform operating temperature, whereby decomposition of the ammonium sulfate is minimized. Any residual gas, including water vapor, is emitted from the upper portion of the reactor, and completed nodules of fertilizer are removed from the reactor. These may be sized and the undersize particles returned to the reactor to function as nuclei for further nodules; likewise, any dust not cohering to the nucleus particles is entrained from the reactor by the residual gases and may be separated to be returned with the undersize particles. Thus, the completed nodules of fertilizer are significantly dust-free.

A point which deserves consideration is the avoidance of formation of ammonium bisulfate ($NH_4HSO_4$). This compound is undesirable because of the low ratio of nitrogen to the other components. Since the formation of ammonium bisulfate accompanies a deficiency of ammonia, this condition can be minimized by proportioning the flow of reactants so that at least they contain the stoichiometric quantity of ammonia needed to yield ammonium sulfate $(NH_4)_2SO_4$. Moreover, if any ammonium bisulfate is formed, it may react with additional ammonia in my process to yield the desired product.

It is also within the concept of this invention to do any or all of the following: (a) pre-coat fine solid particles with a thin film of acid and then introduce them to the fluidized bed, (b) use inert solids as nuclei particles for the reaction product fertilizer, (c) use other acids than sulfuric, for instance nitric or phosphoric, as well as mixed acids, (d) use fertilizer particles as nuclei which are chemically dissimilar from the reaction product fertilizer and (e) use reactant gases other than ammonia. Thus, this invention revolves around the carrying out of a liquid-gas reaction in a fluidized bed, thereby yielding pellicles of a solid reaction product.

Reverting now to the use of the terms fluidize, fluidized-solids and fluidized bed. These terms are used interchangeably in the art to designate a type of dense-suspension wherein finely-divided solid particles are dispersed in an upwardly moving stream of gas. When a gas passes upwardly through a mass of finely-divided solid particles three phenomena may occur. At very low space velocities, say of the order of less than 0.5 feet per second, the gas permeates and diffuses up through the solid mass, without imparting any apparent motion to the particles. The gas velocity through the solid mass is always higher than the space velocity but the latter term is used in the art for convenience; it is the velocity the gases would have if they flowed up through an unobstructed passage having a free cross-sectional area equal to that occupied by the solid mass of particles. At very high superficial velocities, e. g. of the order of 50 feet per second, the gas stream picks up the particles and entrains them with the gas stream, thus forming the typical dilute gas-solid suspension or dispersion, as typified by dusty air. At intermediate space velocities, another phenomenon occurs. At space velocities ranging between about 0.5 and 5.0 feet per second, the gas stream suspends the solid particles to a fluidized condition or bed. A fluidized bed is a very dense suspension of solids in a gas; the solids content may vary from 10 pounds to over 100 pounds per cubic foot depending upon the nature of the particles and the gas velocity. The particles in a fluidized bed are in turbulent, zig-zag motion and in appearance the fluidized bed resembles a boiling liquid; it presents a fluid-like level and the particles therein flow under fluistatic head. But more importantly, from the viewpoint of conducting chemical reactions, is the high heat capacity and rapid heat transfer within a fluidized bed. These qualities result in a very high degree of temperature uniformity throughout a fluidized bed; so much so that a fluidized bed may be characterized as thermally-homogeneous.

While the use of fluidized beds has been prominent in the petroleum refining industry, especially in catalytic cracking, they have not been adapted to many other arts and the above description has been incorporated in this specification in order to distinguish a fluidized bed from wet slurries, so-called fixed beds and dilute dispersions or suspensions. This invention employs fluidized beds as an essential feature of the process.

*Example I*

In forming pellicular nodules of ammonium sulfate, the flow of materials is as outlined previously. I prefer to use 60% sulfuric acid, i. e. sulfuric acid which contains 40% water as a diluent. This concentration of acid reacts with satisfactory speed and in addition contains sufficient diluent water, whose vaporization in the process absorbs most of the exothermic heat of reaction. This serves to keep the temperature of the fluidized bed between 80° and 140° C. Below 100° C. the vapor pressure of water in the reactor vessel is too low for most efficient operation of my process, whereas above 140° C. decomposition of the ammonium sulfate becomes a serious problem. It is to be noted that my process may operate at a temperature above 100° C. whereas it has been reported in the technical literature that ammonium sulfate decomposes at and above 100° C.

In order to maintain satisfactory turbulence of the fluidized particles, it is desirable that the depth of the bed be between about two (2) to six (6) feet. However, these values are not critical and may be altered to suit variations in reactor design and operating conditions. With regard to the ammonia gas supplied to the reactor, it is preferable that this be of at least moderate concentrations and diluted with relatively small quantities of inert gases such as air. For, all other things being equal, the higher the concentration of ammonia gas, the higher the treating capacity for a given reactor size. Since the solids in the bed weigh somewhat about 70 pounds per cubic foot, they exert a fluistatic pressure at the bottom of the bed from about 1.7 to 2.8 pounds per square inch gauge. Considering frictional pressure losses, the gas supplied to the reactor must have a pressure somewhat higher than these values, depending, of course, on the depth of the fluidized bed. Greater bed depths than the ranges indicated will require proportionately higher inlet gas pressures.

In addition to the pressure requirements, the gases should be also supplied in quantities which will yield a fluidizing space velocity, as previously described. Furthermore, the ammonia should be present in amounts slightly above that required for stoichiometric reaction with the sulfuric acid to yield $(NH_4)_2SO_4$ and minimize formation of $NH_4HSO_4$. It is also important that the fluidized bed not be too wet; a deficiency of ammonia may result in an excess of wet particles. Excessive wetness of the particles hampers fluidization as it tends to make the individual particles stick together and also interferes with the diffusion of the gases through the bed. On the other hand, the use of ammonia in quantities significantly higher than that required for complete reaction with the sulfuric acid may result in uneconomical losses of ammonia with the residual gas. So, a careful proportioning must be made with regard to the quantities of ammonia supplied to the reactor.

*Example II*

In the formation of ammonium nitrate by my process, the general flow of materials is similar to the process used for making ammonium sulfate. However, because of the variations in the heat of reaction in forming ammonium nitrate as compared with ammonium sulfate, a less concentrated form of acid may be used i. e., nitric acid containing as much as 45% by weight of water will be satisfactory. Moreover, in view of the relatively high decomposition and melting temperatures of solid ammonium nitrate, temperatures in the bed may be varied between 80° C. and as high as 160° C. In general, the higher temperatures are preferable since the higher temperatures increase the rates of reaction, diffusion and vaporization.

With regard to the use of mixed acids, it may be noted that this invention offers a means of controlling in a simple manner the relative ratios of nutritive components such as nitrogen and phosphorus in the final product fertilizer. Thus, by proportioning the quality and quantity of the fluidizing reactant gas as well as the acid conditions, mixtures or mono- and di-ammonium phosphates, nitrates, and sulfates may be obtained—all in a useful nodulized, pellicular form. The superiority of my methods over conventional practices thus may be appreciated.

In the drawings, Figure 1 is a view of apparatus suitable for practicing this invention and illustrates the flow of materials. Figures 2, 3, 4, and 5 are idealized representations of the mechanism of the formation of a pellicle or layer of solid ammonium sulfate on a nucleus particle.

More particularly in the drawings, Figure 1 represents a single bed reactor vessel collectively designated 11, feed means for the solids collectively designated 12 and solids-classifying means collectively designated 13. The reactor 11 has side-wall members 14, a detachable top member 18 and a detachable bottom member 25, collectively forming a gas-tight vessel. Within the reactor 11 is the bed of fluidized-solids 15 having its upper surface level 16 determined by solid discharge conduit 21. The rate of withdrawal of solids from bed 15 through conduit 21 to classifier 13 is regulated by valve 22. Gas is supplied to the lower portion of reactor 11 and into wind-box 26 through conduit 27. The gas flows up through the orifices 24 of constriction-plate 23 and fluidizes the solids in bed 15. Reactant liquid enters the reactor 11 through conduit 17 and the rate thereof is regulated by valve 41. The reactant liquid is discharged from conduit 17 to spray-head 20 located in freeboard zone 42 and the liquid is downwardly directed toward the fluid-level 16 of bed 15. Conduit 19 located in top member 18 serves to conduct residual gases from the reactor 11. Feed and re-cycled fine solids enter hopper 28 and are forced into reactor 11 below the fluid-level 16 of bed 15 by screw 29 having casing 30. Screw 29 is actuated by pulley 31 which in turn is driven by belt 32, pulley 33 and motor 34.

In starting up the reactor 11, air is supplied under pressure to windbox 26 through conduit 27 and flows up orifices 24 of constriction plate 23 at a fluidizing velocity. Fine particles are supplied by feed-means 12 to reactor 11 at a point above the construction-plate 23. Gradually the level of fluidized-solids builds up and forms bed 15 having fluid-level 16 which coincides with the inlet end of conduit 21. When the fluid-level 16 is established, ammonia gas is supplied through conduit 27 and largely replaces the air. Thereupon, liquid acid is sprayed to bed 15 from spray-head 20 and treated solids are removed from reactor 11 through conduit 21. Residual gases flow up from bed 15 through freeboard-zone 42 and leave the reactor 11 through conduit 19. Any fine solids entrained by the residual gases may be separated by means not shown and the fine solids returned to the reactor 11. Treated solids removed through conduit 21 enter solids-classifier 13 wherein the fine and coarse solids are segregated. Fine solids are re-cycled through conduit 40 to feed-means 12 and the coarse solids are removed through line 43 for further utilization.

Figures 2 through 5 represent the idealized mechanism whereby an individual solid particle 46 in fluidized-bed 15 within reactor 11 is built up to a pellicular nodule. A fine mist or spray 45 of sulfuric acid flows downwardly and forms a thin liquid film 47 on the surface of solid particle 46. It is to be noted that because of the turbulence prevailing in the fluidized-solids bed 15, particles such as 46 are rotating and in rapid linear motion. Gases flowing upwardly contain inert gas particles 49 and reactive gas particles 48. The reactive gas particles 48 are absorbed on the surface of the solid particle 46. Gradually, the absorbed liquid and gaseous films react and form a solid reaction product pellicle or layer 50 which surrounds the solid particle 46. This process continues until the particle is built up to a relatively large nodule or pellet. Depending upon the nature of the gases and acids used, various intermediate solid reaction products may be formed. For example, if ammonium bisulfate forms, it may react with more ammonia to yield ammonium sulfate as

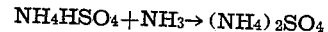

Likewise, ammonium sulfate may react with local excesses of sulfuric acid to yield the bisulfate as:

By proper proportioning of the reactants, as indicated heretofore, the final quantity of these intermediates can be avoided or at least minimized. Similar phenomena may occur when phosphates are produced.

Though I have described an embodiment of this invention wherein the heat of reaction serves to evaporate moisture or diluent water from the reactant liquid, it is also within the concept of this invention to supply auxiliary heat to the reactor vessel. This may be done in several ways, including pre-heating the reactants and inserting heating coils or tubes in the fluidized mass.

Furthermore, though it usually is desirable to proportion the reactant gas, e. g. ammonia, in stoichiometric amounts it is also feasible to supply the reactant gas, in certain instances, in excess of the stoichiometric. When this is done, it is preferable, in order to avoid loss of reactant gas, to pass the gas exiting from the reactor vessel through a condenser or drier to remove evolved water vapor and thereafter compress the residual reactant gas which is thereupon returned to the reactor vessel.

Having described my invention and examples thereof, what I claim is:

1. The process of producing fertilizer material in solid particle form by reaction between ammonia gas and a water solution of an acid selected from the group consisting of nitric, phosphoric, and sulfuric acids, which process comprises the steps of establishing and maintaining a bed of solid fertilizer particles, passing a stream of ammonia-bearing gas upwardly through the bed at a velocity sufficient to maintain the solid particles thereof as a dense turbulent fluidized suspension, supplying to the bed for exothermic reaction therein a substantially stoichiometrical quantity of said acid in water solution to react with the ammonia gas within the bed with the simultaneous evaporation of the water of said solution whereby said reaction takes place on the surfaces of solid particles in the bed so that increments of dry reaction product are formed thereon to yield fertilizer nodules built up to a controlled spherical shape and size, discharging spent fluidizing gas and evaporated water from above the bed, and continuously discharging from the bed a quantity of thus built up fertilizer modules while continuously feeding to the bed undersized solid fertilizer particles.

2. Process according to claim 1, wherein the acid supplied to the bed comprises a mixture of acids selected from the group consisting of nitric, phosphoric, and sulfuric acids.

WILLIAM A. LUTZ.

REFERENCES CITED

The following references are of record in the file of this patent:

UNITED STATES PATENTS

| Number | Name | Date |
|---|---|---|
| 1,884,105 | Moore | Oct. 25, 1932 |
| 1,936,308 | Mueller | Nov. 21, 1933 |
| 1,984,380 | Odell | Dec. 18, 1934 |
| 1,999,573 | Odell | Apr. 30, 1935 |
| 2,037,706 | Curtis | Apr. 21, 1936 |
| 2,047,393 | Siems | July 14, 1936 |
| 2,340,974 | Myers | Feb. 8, 1944 |
| 2,431,455 | Blanding | Nov. 25, 1947 |
| 2,459,836 | Murphree | Jan. 25, 1949 |